United States Patent [19]

Hirayoshi

[11] Patent Number: 4,753,562
[45] Date of Patent: Jun. 28, 1988

[54] DRILL SCREW

[75] Inventor: Takeshi Hirayoshi, Higashi Osakashi, Japan

[73] Assignee: Kobe Fastener Limited, Higashi Osakashi, Japan

[21] Appl. No.: 814,800

[22] Filed: Dec. 30, 1985

[30] Foreign Application Priority Data

Jul. 26, 1985 [JP] Japan .................................. 60-115405

[51] Int. Cl.$^4$ ............................................. F16B 25/00
[52] U.S. Cl. ...................................... 411/387; 408/230
[58] Field of Search ............... 411/387, 386, 417–421; 10/140; 408/211, 212, 214, 215, 227–230

[56] References Cited

U.S. PATENT DOCUMENTS

| 2,479,730 | 8/1949 | Dewar | 10/140 X |
| 2,889,725 | 6/1959 | Turton | 408/228 |
| 3,028,773 | 4/1962 | Borneman | 408/211 |
| 3,079,831 | 3/1963 | Gutshall | 411/418 |
| 3,204,516 | 9/1965 | Wieber | 411/387 |
| 3,318,182 | 5/1967 | Carlson | 411/387 |
| 4,114,508 | 9/1978 | Jeal | 411/387 |

Primary Examiner—Neill Wilson
Attorney, Agent, or Firm—Barnes & Thornburg

[57] ABSTRACT

A drill screw is provided having a head, a male thread section and a drilling section. The screw includes a web on top of the drilling section, and the web has an elongated recess in its central portion. The recess splits the web into chisel edges each rising toward the respective ridges.

4 Claims, 2 Drawing Sheets

FIG.4 (a) Prior Art
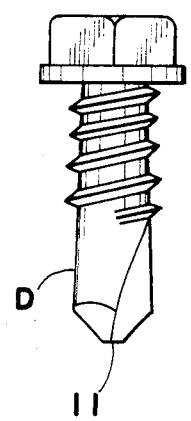
FIG.4(b) Prior Art
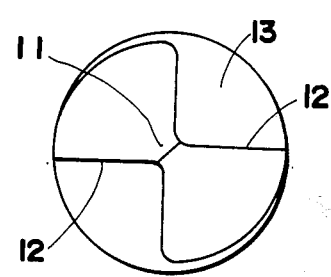

4,753,562

DRILL SCREW

BACKGROUND AND SUMMARY OF THE INVENTION

1. Field of the Invention

The present invention relates to a drill screw for enabling itself to anchor in a threaded hole produced in a metal panel by its own.

2. Description of the Prior Art

In general drilling screws or merely drill screws are known, which have a drill section in the male thread portion. This conventional drill screw can make a threaded hole in the panel with its drill section when it is screwed into the panel. In this way by a single drive drilling, tapping and anchoring are simultaneously performed.

To explain the background of the invention more in detail, reference will be made to FIG. 4:

The illustrated screw is provided with a drilling section (D), which has grooves 13 each forming rake surfaces. In addition the screw has a web 11 whose top is shaped like a dome. The reference numeral 12 denotes cutting edges. The screw is driven into a metal panel by means of an electric driver. As a result a hole is produced by the cutting edges 12 of the screw. However, the central part of the hole is left from cutting because the web 11 is placed in abutment with the central part. The web has no cutting ability. The web 11 is forced into the hole under thrust. Because of the cutting incapability of the web the screw as a whole undergoes a great frictional resistance from the side walls of the hole. The degree of resistance depends upon the hardness of the panel, and the width of the web. This results in the inefficient drilling operation.

The present invention is directed to solve the problems pointed out with respect to the known drill screws, and has for its object to provide an improved drill screw whose web has a cutting ability so as to enhance the efficiency of drilling operation.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a drill screw, which comprises a web on top of the drilling section, the web having an elongated recess in its central portion, wherein the recess is defined by two chisel edges each rising toward the respective ridges, thereby forming a dome-like web.

Other objects, advantages and novel features of the present invention will become apparent from the following detailed description of the invention when considered in conjunction with the accompanying drawings.

BRIEF DESCRIPTION OF THE DRAWINGS

FIGS. 4 (a) and (b) are a front view and a bottom view each on a larger scale of a prior art drilling screw, respectively.

DETAILED DESCRIPTION OF THE DRAWINGS

Figure 1:
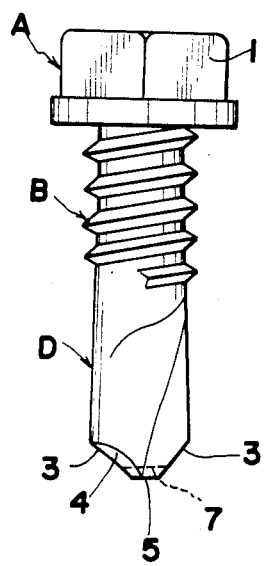
FIG. 1 is a front view showing a drill screw embodying the present invention.
Figure 2:
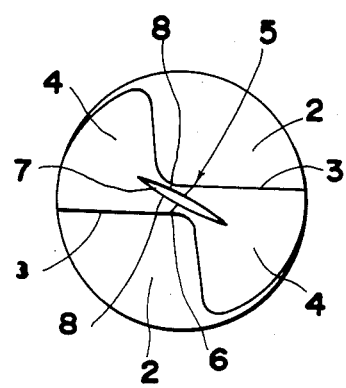
FIG. 2 is a bottom view on a larger scale of the drill screw of FIG. 1.
Figure 3A:
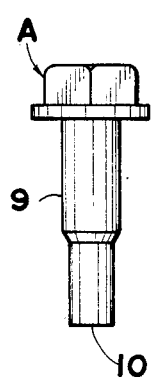
FIGS. 3 (a), (b) and (c) are views exemplifying the steps of fabricating the drill screw of FIG. 1.
Figure 3B:
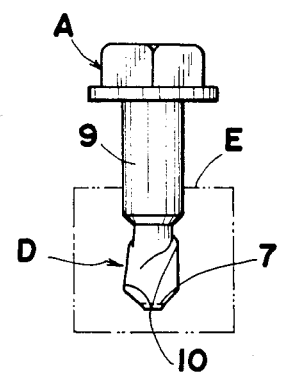
Figure 3C:
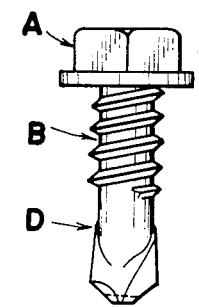

Referring to FIGS. 1 to 3, the screw is provided with a hexagonal head (A) adapted to receive an electric driver, wherein the reference numeral 1 denotes each of the sides. The screw is additionally provided with a threaded portion (B) having male threads, and drilling section (D).

The drilling section (D) has two grooves 2 symmetrically extended from the lowermost top of the drilling section (D) so as to constitute rakes. The reference numeral 3 denotes cutting edges, which are defined by the grooves 2. There are provided relief surfaces 4 located adjacent to the cutting edges 3, and a web 5 also provided between the two grooves 2. The web 5 is shaped like a dome rising toward ridges 6. The reference numeral 7 denotes an elongated recess produced in the center of the web 5, the recess extending to both relief surfaces 4.

The drill screw of the invention is fabricated in the manner shown in FIG. 3:

First, an annealed rod is struck on the head to form the head (A), and the lower part of the rod is worked to form a slender portion and a shank portion 9 having a larger diameter than the slender portion. The next step is shown in FIG. 3 (b). A mold is applied to the slender portion so as to forge the drilling section (D). During the forging the end face 10 of the slender portion is equally pressed so that its central portion contracts under pressure to form the web 5 and the recess 7 so that chisel edges 8 are produced on either side. In this way the drilling section (D) is formed, and then the threads are produced on the shank portion 9 as shown in FIG. 3 (c) to form the threaded portion (B). Finally the screw is quenched.

In the illustrated embodiment the screw is made of metal, but it is possible to use ceramic. The material is not restricted to metal.

The present invention has a great advantage of enabling the screw to anchor in the panel by a single operation, instead of the three operations of drilling, tapping and anchoring. The screw of the invention is driven into the panel under a relatively small thrust. When a large number of screws are to be fastened to a panel, the drill screws of the invention is particularly advantageous.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A drill screw having a head, a male thread section and a drilling section, said drilling section comprising:
   axially extending flutes defining a web therebetween;
   relief surfaces intersecting said flutes to define cutting edges;
   a ridge formed by the intersection of said relief surfaces at an end of said drilling section; and
   an elongated and substantially transverse recess extending across said ridge and defining chisel edges at the intersection of said recess and said relief surfaces, said chisel edges (8) rising toward said ridge.

2. A drill screw as in claim 1, wherein said drilling section includes a center axis, said elongated recess extending across said drilling section center axis.

3. A drill screw as in claim 1, wherein said web is disposed only in a central area of said drilling section.

4. A drill screw as in claim 1, wherein said drilling section includes an outer circumference and a central area spaced inwardly from said outer circumference, said chisel edges being disposed only in said central area of said drilling section and said cutting edges extending out to said drilling section outer circumference.

* * * * *